US012762006B2

(12) United States Patent
Atta et al.

(10) Patent No.: US 12,762,006 B2

(45) Date of Patent: Oct. 13, 2026

(54) DEVICE TO CONNECT A NO-POST/NO-VIDEO INFORMATION HANDLING SYSTEM TO A REMOTE SERVER

(71) Applicant: DELL PRODUCTS L.P., Round Rock, TX (US)

(72) Inventors: Venkata Rama Krishna Rao Atta, Hyderabad (IN); Ibrahim Sayyed, Georgetown, TX (US); Marcin Nowak, Prosper, TX (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 19/067,953

(22) Filed: Mar. 2, 2025

(65) Prior Publication Data

US 2026/0259790 A1 Sep. 3, 2026

(51) Int. Cl.

*G06F 11/00* (2006.01)

*G06F 11/07* (2006.01)

(52) U.S. Cl.

CPC ........ *G06F 11/079* (2013.01); *G06F 11/0745* (2013.01); *G06F 11/0766* (2013.01)

(58) Field of Classification Search

None

See application file for complete search history.

(56) References Cited

U.S. PATENT DOCUMENTS

| | | | |
|---|---|---|---|
| 9,798,606 B2 | 10/2017 | Andrews et al. | |
| 9,959,127 B2 | 5/2018 | Seibert et al. | |
| 2020/0204382 A1* | 6/2020 | Lagrange | H04L 12/40039 |
| 2023/0102470 A1* | 3/2023 | Sultenfuss | G06F 1/28 713/300 |
| 2025/0368077 A1* | 12/2025 | Wu | B60L 53/62 |

* cited by examiner

*Primary Examiner* — Bryce P Bonzo

*Assistant Examiner* — Gabriella Kanani Shelton

(74) *Attorney, Agent, or Firm* — Larson Newman, LLP

(57) ABSTRACT

A charger adapter for an information handling system includes a storage and an embedded controller. The storage stores failure data associated with the information handling system. The embedded controller detects an external device connected to the charger adapter. In response to the detection of the external device, the embedded controller configures the charger adapter in a read-only mode. During the read-only mode, the adapter receives a read request from the external device. In response to the read request, the adapter provides the failure data to the external device.

20 Claims, 3 Drawing Sheets

100

DEVICE TO CONNECT A NO-POST/NO-VIDEO INFORMATION HANDLING SYSTEM TO A REMOTE SERVER

FIELD OF THE DISCLOSURE

The present disclosure generally relates to information handling systems, and more particularly relates to connecting a no-post/no-video information handling system to a remote server.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A charger adapter for an information handling system includes a storage and an embedded controller. The storage may store failure data associated with the information handling system. The embedded controller may detect an external device connected to the charger adapter. In response to the detection of the external device, the embedded controller may configure the charger adapter in a read-only mode. During the read-only mode, the adapter may receive a read request from the external device. In response to the read request, the adapter may provide the failure data to the external device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
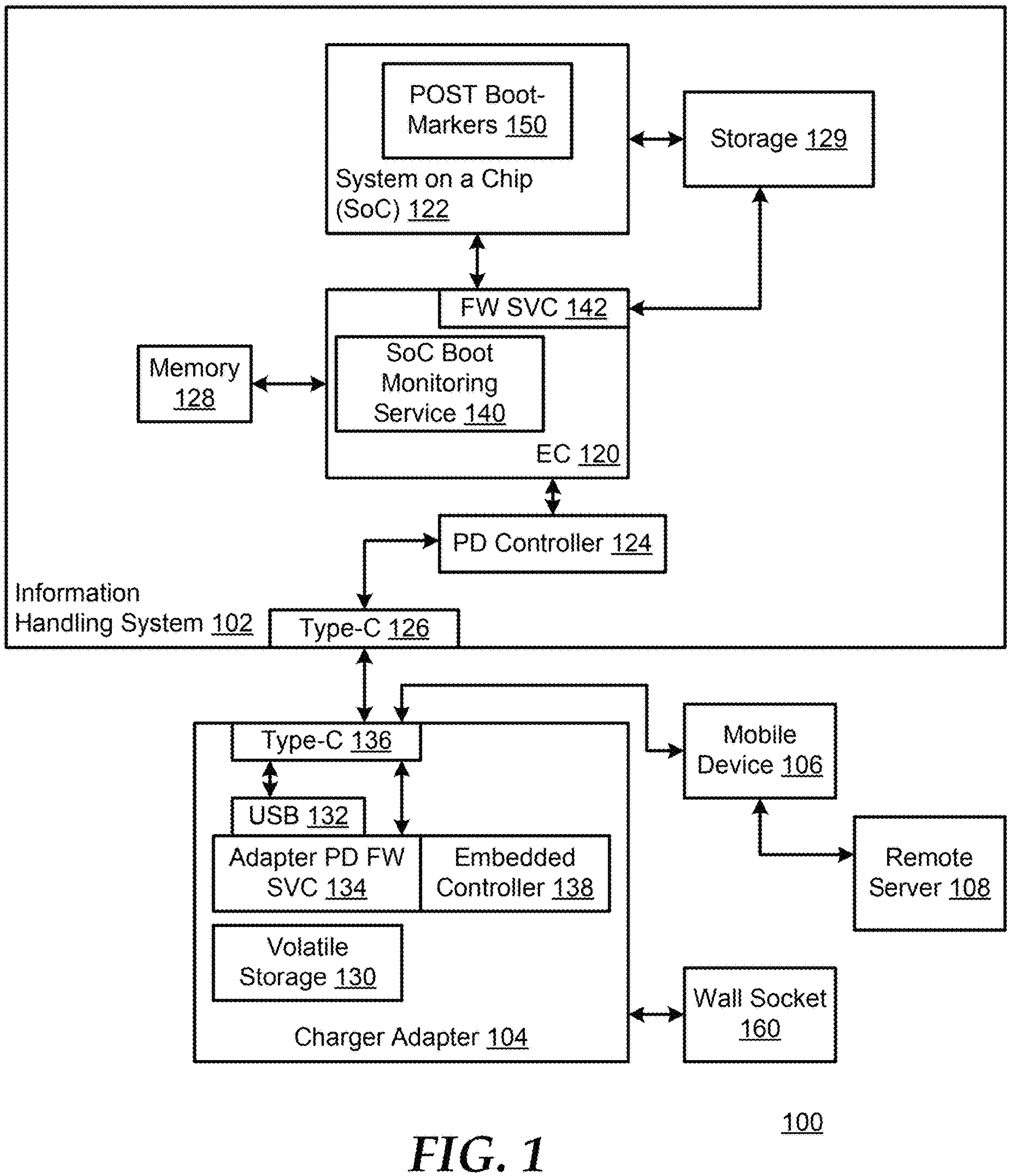
FIG. 1 is a block diagram of portion of a system including an information handling system, a charger adapter, a mobile device, and a remote server according to at least one embodiment of the present disclosure.

FIG. 1 illustrates a portion of a system 100 including an information handling system 102, a charger adapter 104, a mobile device 106, and a remote server 108 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes an embedded controller 120, a system on a chip (SoC) 122, a power delivery (PD) controller 124, a universal serial bus (USB) type-C connector 126, a memory 128, and a storage 129. Charger adapter 104 includes a volatile storage 130, a USB connector 132, an adapter PD firmware (FW) service 134, a type-C connector 136, and an embedded controller 138. Embedded controller 120 includes a SoC boot monitoring service 140 and a firmware service (FW-SVC) 142. SoC 122 includes power-on self-test (POST) boot markers 150. Information handling system 102 and charger adapter 104 may include additional components without varying from the scope of this disclosure.

During start-up of information handling system 102, embedded controller 120 may perform any suitable operations associated with the power sequencing for SoC 122. For example, embedded controller 120 may enable required power rails for SoC 122 by configuring the voltage rails of information handling system 102 in a predefined sequence. In some situations, embedded controller 120 may fail to configure the voltage rails on information handling system 102, which may result in a no power state (NP). In response to the failure and NP state, embedded controller 120 may send voltage rail configuration failure data with the error code to PD controller 124 via any suitable communication channel. For example, embedded controller 120 may provide the voltage rail configuration failure data over the system management bus (SMBus) communication channel. PD controller 124 may send the error code and failure data to adapter PD FW service 134 via type-C connectors 126 and 136.

In an example, PD controller 124 may utilize a side band communication, such as the configuration channel (CC) line of USB type-C connectors 126 and 136, to provide data between EC 120 and adapter PD FW service 134. For example, embedded controller 120 may provide the voltage rail configuration failure data with the error code via vendor defined message (VDM) messages over CC lines between type-C connectors 126 and 136. In an example, embedded controller 138 or a PD connector of adapter 104 may execute PD firmware service 134 to receive the voltage rail configuration failure data with the error code from embedded controller 120.

In certain examples, PD firmware service 134 may utilize USB interface 132 to receive the voltage rail configuration failure data with the error code. In response to the reception of the voltage rail configuration failure data with the error code, embedded controller 138 may store the voltage rail configuration failure data with the error code in volatile storage 130 for later use. In certain examples, charger adapter 104 may store the data associated with the voltage rail configuration failure data with the error code in storage 130 as along as the charger adapter is connected to a wall socket 160.

In an example, when the power sequencing is successful, embedded controller 120 may power on SoC 122 to start the POST process. In response to powering on SoC 122, embedded controller 120 may start monitoring the POST status of the SoC. In an example, the POST of SoC 122 may be designed with detailed boot markers 150 at every critical step of POST. During the POST, SoC 122 may perform different phases including, but not limited to, a power supply check, a basic input/output system (BIOS) verification, a central processing unit (CPU) initialization, memory testing, device detection, interrupt controller check, time check, video initialization, and boot device selection.

In certain examples, SoC 122 may perform POST boot operations based on a BIOS image stored in memory 128. In an example, the BIOS image for SoC 122 may be designed with boot markers 150 at for every critical stage of the POST flow or process. These critical stages of the POST may be any stages of the POST, such as security (SEC), pre-extensible firmware interface (pre-PEI), driver execution environment (DXE), and boot device selection (BDS). In response to a boot marker stage during the POST being performed, the BIOS of SoC 122 may provide the corresponding boot marker 150 to embedded controller 120 over any available communication as per the SoC design.

In an example, embedded controller 120 may keep track of SoC 122 POST process through the received boot markers 150. Embedded controller 120 may store the received boot markers 150 in memory 128. While monitoring the POST via SoC monitoring service 140, embedded controller 120 may determine whether each subsequent boot marker 150 is received before a timeout event has occurred. In response to the next boot marker 150 being received before the timeout event, embedded controller 120 may determine whether a boot marker 150 is the last boot marker for the POST process. In an example, embedded controller 120 may determine whether the received boot marker is the last boot marker based on a boot marker table stored in memory 128. In certain examples, the boot marker table may be created during the build time of the BIOS and embedded controller 120 of information handling system 102.

Embedded controller 120 may continuously perform a SoC boot monitoring loop which includes, but is not limited to, receiving a boot marker 150, storing the boot marker in memory 128, determining whether the timeout event has occurred, and determining whether the boot marker is the last boot marker. In an example, embedded controller 120 may exit the SoC boot monitoring loop if either the last boot marker is received or the timeout event occurred before the next boot marker 150 is received.

In response to the timeout event occurring before the next boot marker is received, embedded controller 120 may determine that a boot failure has occurred. Based on the determination of a POST failure, embedded controller 120 may provide a notification to a user of information handling system 102 about the POST failure. For example, embedded controller 120 may use any available light emitting diodes (LEDs), such as CAPSLOCK and NUMLOCK keys, to indicate to the user of information handling system 102 that the POST failure occurred. In an example, the LEDs may continuously blink, blink in a particular pattern, or the like to indicate that the POST failure occurred in information handling system 102.

Based on the determination of a POST failure, embedded controller 120 may also provide the POST failed boot marker code 150 and corresponding telemetry data to PD controller 124 via any suitable communication channel. For example, embedded controller 120 may provide the POST failed boot marker code 150 and corresponding telemetry data over the SMBus communication channel. PD controller 124 may send the POST failed boot marker code 150 and corresponding telemetry data to adapter PD FW service 134 via type-C connectors 126 and 136.

In an example, PD controller 124 may utilize a side band communication, such as the CC line of USB type-C connectors 126 and 136, to provide data between EC 120 and adapter PD FW service 134. For example, embedded controller 120 may provide the POST failed boot marker code 150 and corresponding telemetry data via VDM messages over CC lines between type-C connectors 126 and 136. In an example, adapter 104 may execute PD firmware service 134 to receive the POST failed boot marker code 150 and corresponding telemetry data from embedded controller 120.

In certain examples, PD firmware service 134 may utilize USB interface 132 to receive the POST failed boot marker code 150 and corresponding telemetry data. In response to the reception of the POST failed boot marker code 150 and corresponding telemetry data, embedded controller 138 may store the POST failed boot marker code 150 and corresponding telemetry data in volatile storage 130 for later use. In certain examples, charger adapter 104 may store the data associated with the POST failed boot marker code 150 and corresponding telemetry data in storage 130 as along as the charger adapter is connected to wall socket 160.

As described above, charger adapter 104 may store failure data associated with information handling system 102 in storage 130 as long as the power adapter is connected to wall socket 160. In certain examples, the failure data may include, but is not limited to, the voltage rail configuration failure data with the error code, and POST failed boot marker code 150 and corresponding telemetry data.

In certain examples, mobile device 106 may execute any suitable application to access charger adapter 104, retrieve the failure data, and provide the failure data to remote server 108. When an individual connects charger adapter 104 of information handling system 102 to mobile device 106, the charger adapter may redefine its function class from adapter to vendor specific diagnostic USB read-only storage device. In an example, charger adapter 104 may perform any suitable operations to operate as a vendor specific diagnostic USB read-only storage device. For example, adapter PD firmware service 134 may cause different components within charger adapter 104 to stop providing power to information handling system 102 through USB type-C connector 136. After charger adapter 104 is no longer providing power to information handling system 102, embedded controller 138 via adapter PD firmware service 134 may grant mobile device 106 with access to storage 130.

In certain examples, adapter PD firmware service 134 may communicate with mobile device 106 via a side-band communication of USB type-C connector 136, via a wireless module, or the like. PD firmware service 134 and embedded controller 138 may operate as pass-through components to provide mobile device 106 with access to storage 130. In certain examples, embedded controller 138 may operate as a memory controller for storage 130. For example, embedded controller 138 may receive VDM messages that include read requests for the failure data from mobile device 106. In response to the VDM read requests, embedded controller 138 may retrieve the corresponding failure data and provide the data to mobile device 106 via PD firmware service 134.

In an example, based on charger adapter 104 entering a vendor specific diagnostic USB read-only storage device as described above, embedded controller 138 may reject or deny any write requests received from mobile device 106. In this example, if mobile device 106 provides a VDM message with a write request and corresponding data, embedded controller 138 may discard the write request and corresponding write data. Embedded controller 138 may also provide a message, such as a VDM message, to mobile device 106 indicating that the mobile device does not have permission or authorization to write to storage 130 of adapter charger 104. Thus, adapter charger 104 may be configured in a read-only mode to provide the failure data to mobile device 106.

In an example, the wireless module may enable a short-range communication between power adapter 104 and mobile device 106. For example, adapter PD firmware service 134 may communicate with mobile device 106 via a wireless module implementing wireless fidelity (WiFi) connectivity, Bluetooth connectivity, or the like. In an example, mobile device 106, via a service application, may retrieve the failure data. In response to retrieving the failure data, mobile device 106, via the service application, may connect with remote server 108 and provide the failure data to the remote server.

In certain examples, in information technology (IT) administrator associated with information handling system 102 and remote server 108 may utilize the failure data to determine the best course of action to fix the information handling system. In certain examples, the use of the failure data may include analyzing the boot markers 150 and diagnostic code to determine any possible failure points in POST. Additionally, the use of the failure data may include analyzing voltage rail configuration failure data with the error code to determine any possible failure points in the power sequencing.

Figure 2:
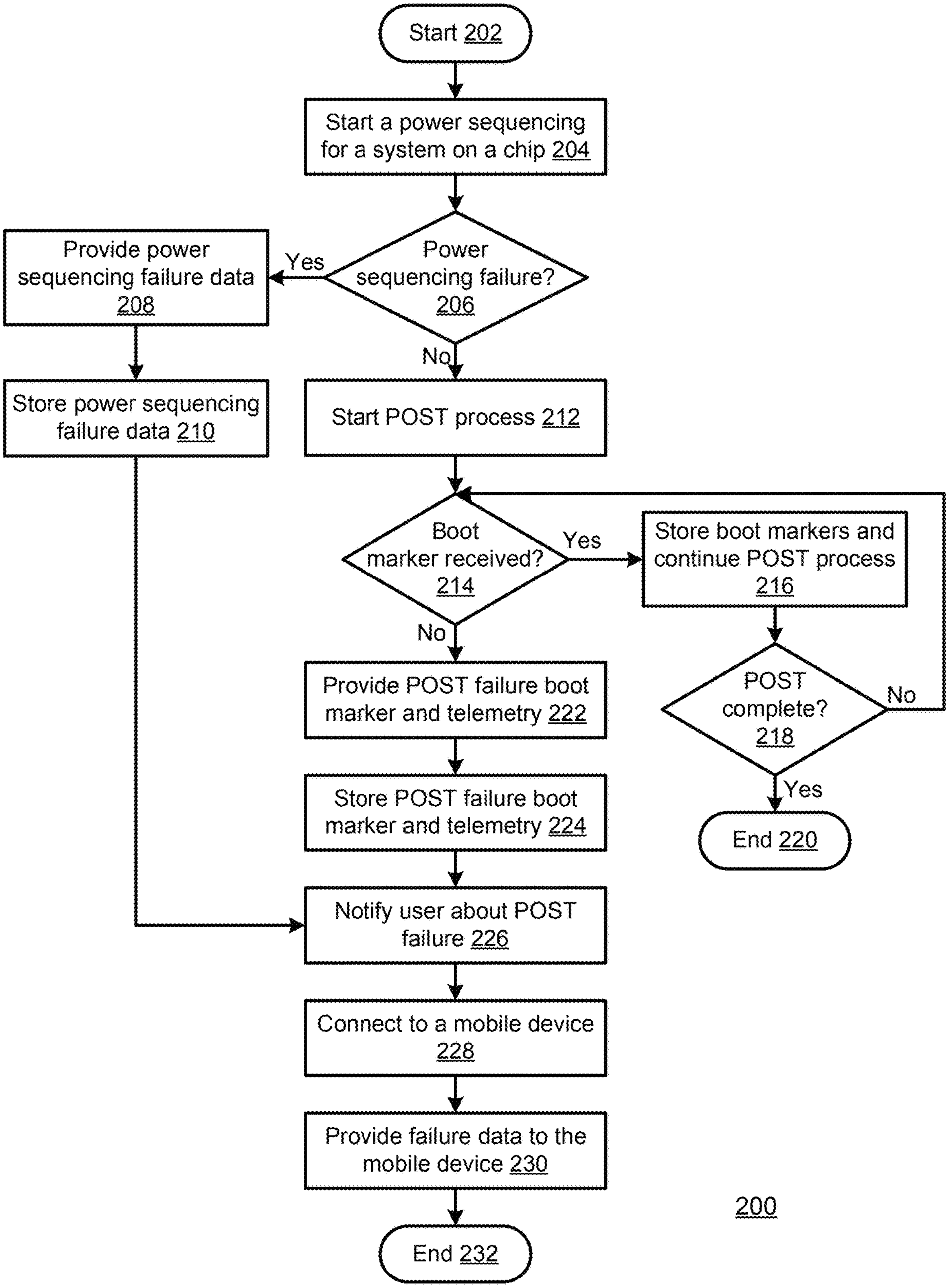
FIG. 2 is a flow diagram of a method for connecting a no-post/no-video information handling system to a remote server according to at least one embodiment of the present disclosure.

FIG. 2 shows a method 200 for connecting a no-post/no-video information handling system to a remote server according to at least one embodiment of the present disclosure, starting at block 202. Not every method step set forth in this flow diagram is always necessary, and certain steps of the methods may be combined, performed simultaneously, in a different order, or perhaps omitted, without varying from the scope of the disclosure. FIG. 2 may be employed in whole, or in part, embedded controller 120 of information handling system 100 in FIG. 1, SoC 122 of information handling system 100 in FIG. 1, and charger adapter 104 in FIG. 1, or any other type of controller, device, module, processor, or any combination thereof, operable to employ all, or portions of, the method of FIG. 2.

At block 204, a power sequencing is started. In an example, an embedded controller of an information handling system may perform any suitable operations associated with the power sequencing for a SoC of the information handling system. For example, the embedded controller may enable required power rails for the SoC by configuring the voltage rails of the information handling system in a predefined sequence.

At block 206, a determination is made whether the power sequencing failed. In some situations, the embedded controller may fail to configure the voltage rails on the information handling system, which may result in a no power state (NP). In response to the power sequencing failure, the power sequencing failure data is provided at block 208. In an example, the embedded controller may provide the power sequencing failure data to a charger adapter connected to the information handling system via USB type-C connectors. In certain examples, the failure data may be provided as VDM messages over a side band communication, such as the CC line of the USB type-C connectors.

At block 210, the power sequencing failure data is stored and the flow continues as will be described below at block 222. In an example, the power sequencing failure data may be stored in a volatile storage of a charger adapter connected to the information handling system. In certain examples, the power sequencing failure data may be stored as long as the charger adapter is connected to a wall socket.

In response to the power sequencing succeeding, a POST process is started at block 212. In an example, the POST of the SoC may be designed with detailed boot markers at every critical step of POST. During the POST, the SoC may perform different phases including, but not limited to, a power supply check, a BIOS verification, a CPU initialization, memory testing, device detection, interrupt controller check, time check, video initialization, and boot device selection. In certain examples, the SoC may perform the POST boot operations based on a BIOS image. In an example, the BIOS image may be designed with boot markers at for every critical stage of the POST flow or process. These critical stages of the POST may be any stages of the POST, such as the SEC phase, the pre-PEI phase, the DXE phase, and the BDS phase.

At block 214, a determination is made whether a boot marker is received. While monitoring the POST via a SoC monitoring service, the embedded controller may determine whether each subsequent boot marker is received before a timeout event has occurred. In response to the boot marker being received, the boot marker is stored at block 216. At block 218, a determination is made whether the POST process is complete. If the POST process is not complete, the flow continues at block 214. If the POST process is complete, the flow ends at block 220.

In response to the boot marker not being received, the POST failure boot marker and telemetry data is provided at block 222. In an example, the embedded controller may provide the POST failure boot marker and telemetry data to a charger adapter connected to the information handling system via USB type-C connectors. In certain examples, the failure data may be provided as VDM messages over a side band communication, such as the CC line of the USB type-C connectors.

At block 224, the POST failure boot marker and telemetry data is stored. In an example, the POST failure boot marker and telemetry data may be stored in a volatile storage of a charger adapter connected to the information handling system. In certain examples, the POST failure boot marker and telemetry data may be stored as long as the charger adapter is connected to a wall socket.

At block 226, a user is notified about the POST failure. For example, an embedded controller may use any available light emitting diodes (LEDs), such as CAPSLOCK and NUMLOCK keys, to indicate to the user of the information handling system that the POST failure occurred. In an example, the LEDs may continuously blink, blink in a particular pattern, or the like to indicate that the POST failure occurred in the information handling system.

At block 228, the charger adapter is connected to a mobile device. In certain examples, the mobile device may execute any suitable application to connect/access the charger adapter and retrieve the failure data. When an individual connects the charger adapter to the mobile device, the charger adapter may redefine its function class from adapter to vendor specific diagnostic USB read-only storage device.

In response to the charger adapter being connected to the mobile device, the failure data is provided to the mobile device at block 230 and the flow ends at block 232. In an example, the mobile device, via a service application, may retrieve the failure data. Additionally, in response to retrieving the failure data, the mobile device, via the service application, may connect with a remote server and provide the failure data to the remote server.

Figure 3:
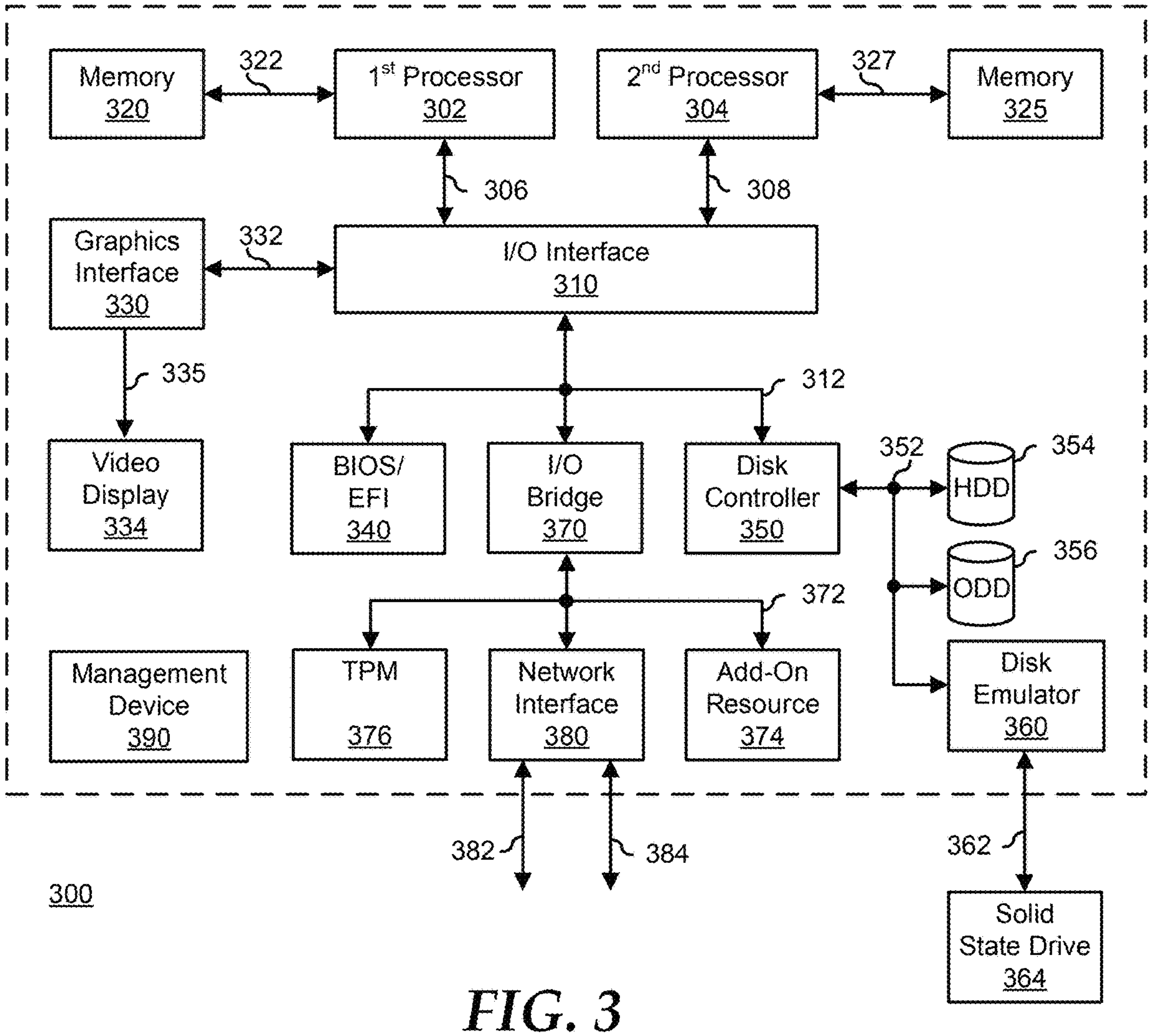
FIG. 3 is a block diagram of a general information handling system according to an embodiment of the present disclosure.

FIG. 3 shows a generalized embodiment of an information handling system 300 according to an embodiment of the present disclosure. Information handling system 300 may be substantially similar to information handling system 102 of FIG. 1. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 4394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A charger adapter for an information handling system, the charger adapter comprising:
- a storage to store failure data associated with the information handling system; and
- an embedded controller to communicate with the storage, the embedded controller to:
  - detect an external device connected to the charger adapter;
  - in response to the detection of the external device, configure the charger adapter in a read-only mode; and
  - during the read-only mode:
    - receive a read request from the external device; and
    - in response to the read request, provide the failure data to the external device.

2. The charger adapter of claim 1, further including: a universal serial bus (USB) type-C connector in communication with the embedded controller, wherein the external device is connected to the charger adapter via the USB type-C connector.

3. The charger adapter of claim 1, wherein the storage maintains the failure data while the charger adapter is connected to a wall adapter.

4. The charger adapter of claim 1, wherein the embedded controller further to: receive the failure data via a vendor defined message from the information handling system.

5. The charger adapter of claim 1, wherein the embedded controller further to: execute a firmware service to communicate with the information handling system and with the external device.

6. The charger adapter of claim 1, wherein the failure data includes voltage rail configuration failure data with an error code.

7. The charger adapter of claim 1, wherein the failure data includes a power on self-test (POST) failed boot marker and corresponding telemetry data.

8. The charger adapter of claim 1, wherein the external device is a mobile device.

9. A method comprising:

receiving, by an embedded controller of a charger adapter, failure data associated with an information handling system connected to the charger adapter;

storing, by the embedded controller, the failure data in a storage of the charger adapter;

detecting an external device connected to the charger adapter;

in response to the detection of the external device, configuring the charger adapter in a read-only mode; and during the read-only mode:

receiving a read request from the external device; and in response to the read request, providing the failure data to the external device.

10. The method of claim 9, further comprising: detecting the connection with the external device via a universal serial bus (USB) type-C connector of the charger adapter.

11. The method of claim 9, further comprising: maintaining the failure data in the storage while the charger adapter is connected to a wall adapter.

12. The method of claim 9, further comprising: receiving the failure data via a vendor defined message from the information handling system.

13. The method of claim 9, further comprising: executing a firmware service to communicate with the information handling system and with the external device.

14. The method of claim 9, wherein the failure data includes voltage rail configuration failure data with an error code.

15. The method of claim 9, wherein the failure data includes a power on self-test (POST) failed boot marker and corresponding telemetry data.

16. The method of claim 9, wherein the external device is a mobile device.

17. A system comprising:

an information handling system including:

a first embedded controller to:

perform a power on sequencing of the information handling system;

monitor power-on self-test (POST) operations of a system-on-a-chip (SoC) in the information handling system; and in response to a failure of the power on sequencing or the POST operations, provide failure data associated with the failure; and a charger adapter to communicate with the information handling system, the charger adapter including:

a storage to store the failure data associated with the information handling system; and a second embedded controller to communicate with the storage, the second embedded controller to:

detect an external device connected to the charger adapter;

in response to the detection of the external device, configure the charger adapter in a read-only mode; and during the read-only mode:

receive a read request from the external device; and in response to the read request, provide the failure data to the external device.

18. The system of claim 17, wherein the charger adapter further includes: a universal serial bus (USB) type-C connector in communication with the embedded controller, wherein the external device is connected to the charger adapter via the USB type-C connector.

19. The system of claim 17, wherein the storage maintains the failure data while the charger adapter is connected to a wall adapter.

20. The system of claim 17, wherein the second embedded controller further to: execute a firmware service to communicate with the information handling system and with the external device.

* * * * *